United States Patent
Abe et al.

(10) Patent No.: US 8,602,477 B2
(45) Date of Patent: Dec. 10, 2013

(54) STRUCTURE FOR ATTACHING DISPLAY UNIT

(75) Inventors: Yujiro Abe, Tokyo (JP); Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/319,226

(22) PCT Filed: Aug. 6, 2009

(86) PCT No.: PCT/JP2009/003771
§ 371 (c)(1),
(2), (4) Date: Nov. 7, 2011

(87) PCT Pub. No.: WO2011/016088
PCT Pub. Date: Feb. 10, 2011

(65) Prior Publication Data
US 2012/0055966 A1    Mar. 8, 2012

(51) Int. Cl.
*B60R 7/04* (2006.01)

(52) U.S. Cl.
USPC ................................ 296/37.8; 224/311

(58) Field of Classification Search
USPC ......... 296/210, 1.07, 37.7, 37.8; 24/457, 458; 224/311
See application file for complete search history.

(56) References Cited

U.S. PATENT DOCUMENTS

| | | | |
|---|---|---|---|
| 5,636,891 A | 6/1997 | Van Order et al. | |
| 6,481,682 B2 * | 11/2002 | Miura | 248/231.9 |
| 6,974,292 B2 * | 12/2005 | Hansen | 411/508 |
| 7,073,230 B2 * | 7/2006 | Boville | 24/297 |
| 7,120,971 B2 * | 10/2006 | Osterland et al. | 24/295 |
| 7,267,361 B2 * | 9/2007 | Hofmann et al. | 280/728.2 |
| 7,340,808 B2 * | 3/2008 | Baekelandt | 24/453 |
| 8,214,974 B2 * | 7/2012 | Zhou et al. | 24/458 |
| 2002/0085129 A1 | 7/2002 | Kitazawa | |
| 2003/0213884 A1 * | 11/2003 | Ikunami | 248/346.01 |
| 2009/0079141 A1 * | 3/2009 | Qiang et al. | 277/650 |
| 2009/0199372 A1 * | 8/2009 | Anderson | 24/458 |
| 2010/0251621 A1 * | 10/2010 | Donoho | 49/493.1 |
| 2011/0203081 A1 * | 8/2011 | Iwahara et al. | 24/458 |

FOREIGN PATENT DOCUMENTS

| | | | |
|---|---|---|---|
| JP | 2001-105988 A | 4/2001 | |
| JP | 2001-347895 A | 12/2001 | |
| JP | 2002-240642 A | 8/2002 | |
| JP | 2003-333458 A | 11/2003 | |
| JP | 2005-104349 A | 4/2005 | |
| JP | 2005-313825 A | 11/2005 | |
| JP | 3124281 U | 8/2006 | |

* cited by examiner

*Primary Examiner* — H Gutman
(74) *Attorney, Agent, or Firm* — Birch, Stewart, Kolasch & Birch, LLP

(57) ABSTRACT

A display unit attaching structure includes: a plurality of first rhombic clips 7 for engaging with engaging holes 51 of a vehicle roof sheet metal 5; a base sheet metal 2 on one side of which an engaging section 22 is formed, and on the other side of which a supporting section 24 with an engaging hole 23 is formed; and a display main body 3 in which the display is pivotally supported openably and closably in a housing section of a display 4, on one side of which an engaging section 34 for engaging with the engaging section 22 of the base sheet metal 2 is provided, and on the other side of which a second rhombic clip 9 for engaging with the engaging hole 23 is provided.

4 Claims, 3 Drawing Sheets

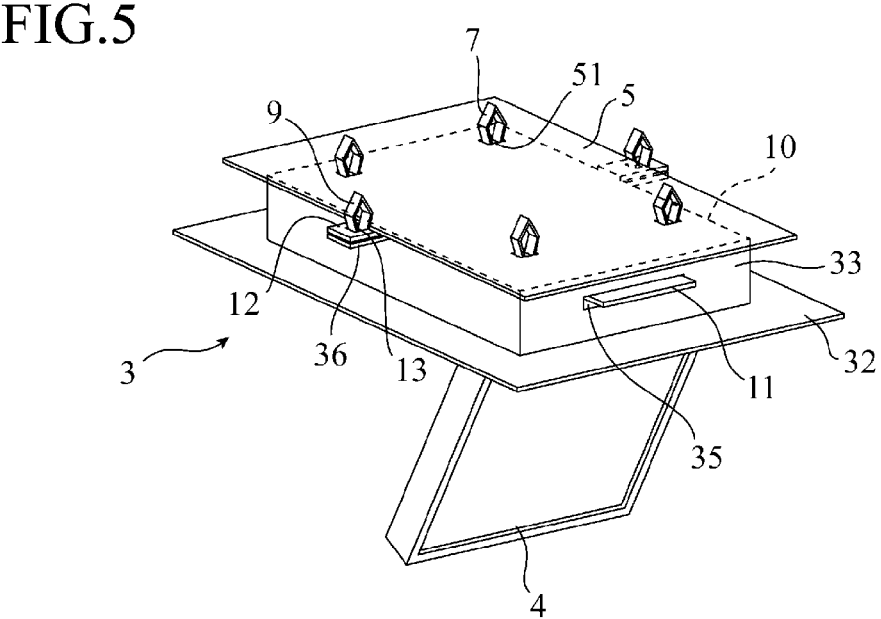
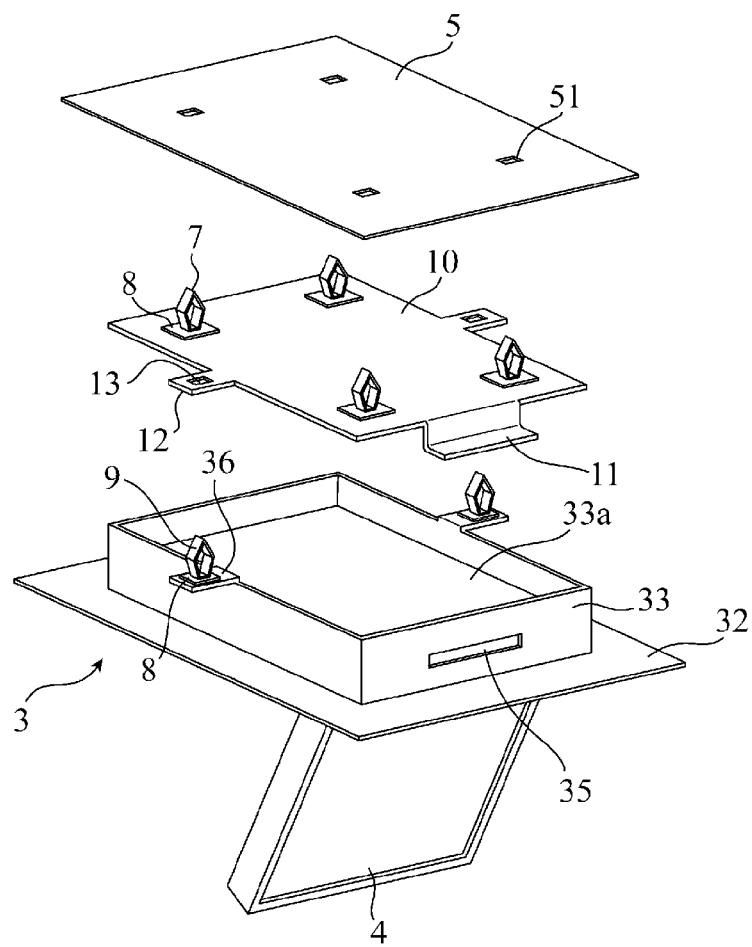

STRUCTURE FOR ATTACHING DISPLAY UNIT

TECHNICAL FIELD

The present invention relates to a structure for attaching a display unit to a roof sheet metal of a vehicle.

BACKGROUND ART

A display unit is composed of a base sheet metal, a display main body, and a display, and the display unit is attached to a vehicle roof sheet metal on a vehicle production line. In such an attachment, conventionally, a vehicle roof sheet metal and a base sheet metal as well as the base sheet metal and a display main body have been fastened with a clip or screw. However, in the above attaching structure, an attaching work efficiency thereof is unfavorable on the vehicle production line; particularly, in detaching a display unit from a vehicle roof sheet metal for internal inspection and replacement, it is necessary to remove the clips; therefore, it is necessary to prepare bored holes for inserting a screw driver for removing clip-attaching screws in a partition board provided inside a display main body.

Further, Patent Document 1 discloses an arrangement for quickly attaching and detaching a multimedia unit to and from a flip-down base provided on a vehicle ceiling.

PRIOR ART DOCUMENTS

Patent Documents

Patent Document 1: Japanese Utility Model Registration No. 3124281

SUMMARY OF THE INVENTION

However, in the conventional arrangement, it is necessary that a partition board provided inside a display main body is provided with holes to be passed through by a screw driver for removing a screw of a clip. Therefore, when a display is opened to a use position, the holes are seen from under to mar the appearance thereof. In addition, processing costs are required to form the holes, and also some effects are caused upon the shape and size of a board to be located corresponding to the holes.

Further, since the display unit has a considerable weight, in attaching and detaching the display unit to and from a vehicle roof sheet metal, it is necessary to handle clip-attaching screws while the heavy unit is being supported from below, which makes the work extremely difficult. The work of two persons is required: for example, one person supports a display unit from below, while the other person handles screws of clips. Therefore, there is a problem such that since a work efficiency thereof on a vehicle production line is unfavorable, a line work thereof cannot be simply and quickly carried out.

Moreover, the art disclosed by Patent Document 1 attaches and uses a portable multimedia unit to a flip-down base provided to a vehicle ceiling when a user uses a car, and detaches the unit from the flip-down base when the user leaves the car. The art allows quick attachment and detachment of the portable multimedia unit, and also enables to be safely fixed thereto for a long time during the attached condition. Therefore, the arrangement in the art is different from that in the invention in which a display unit is secured to a vehicle roof sheet metal, and the unit is detached therefrom in a special case of internal inspection, replacement or the like. The above-discussed problems are not at all considered in the art.

The present invention has been made to solve the above-discussed problems, and an object of the invention is to provide a display unit attaching structure that enables to enhance a work efficiency thereof in attaching and detaching of a display main body on a vehicle production line, and also eliminates the necessity of providing a hole for inserting a tool through a partition board inside the display main body to solve an inconvenience involved in hole processings to provide an enhanced appearance thereof.

A display unit attaching structure of the invention includes: a vehicle roof sheet metal provided with a plurality of engaging holes; a base sheet metal which has first press-fit clips for engaging with the engaging holes of the vehicle roof sheet metal, and also on one side of which an engaging section is formed, and on the other side of which a supporting section having an engaging hole is formed; and a display main body which pivotally supports a display openably and closably in a display housing section, and also on one side of which an engaging section for engaging with the engaging section of the base sheet metal is provided, and on the other side of which a second press-fit clip for engaging with the engaging hole is provided.

According to the invention, it is configured that the base sheet metal is attached to the vehicle roof sheet metal by engaging the first press-fit clips with the engaging holes of the roof sheet metal, and that the display main body is attached to the base sheet metal by engaging one side thereof with the base sheet metal in the engaging section, and by attaching the other side thereof to the engaging hole of the base sheet metal by press-fitting; thus, the attachment is extremely easy, and the attachment and detachment on a vehicle production line can be easily and quickly performed. In detaching the display main body from the base sheet metal for internal inspection and replacement, since the second press-fit clip is disengaged from the engaging hole by pulling down the portion of the display main body opposite to the engaging section thereof with a force larger than the engaging force of the second press-fit clip, further the display main body is moved to the disengaged side to release the engagement of the engaging section, thus extremely easily detaching the display main body from the base sheet metal.

As a result, the attaching and detaching works can be carried out by a single person to thus enhance a work efficiency thereof. Further, when the display main body is detached from the base sheet metal, the attaching screws of the first press-fit clips attached to the base sheet metal can be manipulated, which eliminates the necessity of providing a hole for inserting a tool through the partition board inside the display main body. Therefore, a processing cost thereof can be reduced, and also upon opening of the display main body, an outer appearance thereof is not damaged. Furthermore, there is an advantageous effect such that the shape and size of a circuit-elements mounting board have no opposite effects involved in hole processings.

BRIEF DESCRIPTION OF THE DRAWINGS

FIG. 5 is a perspective view showing a state where a display unit is attached to a vehicle roof sheet metal in a second embodiment of the invention.

FIG. 6 is an exploded perspective view of the display unit and the vehicle roof sheet metal.

BEST MODE FOR CARRYING OUT THE INVENTION

In the following, an embodiment of the present invention will be specifically described with reference to appended drawings.

First Embodiment

Figure 1:
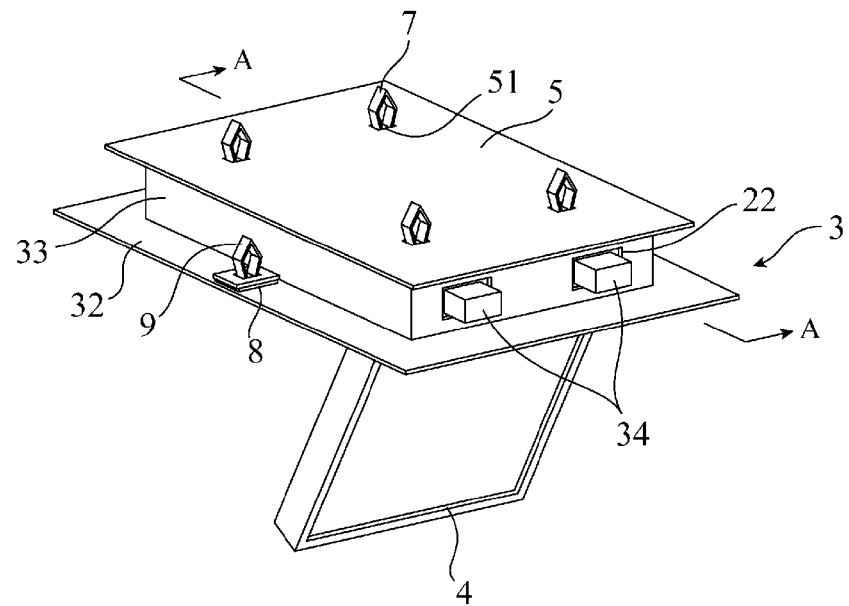
FIG. 1 is a perspective view showing a state where a display unit is attached to a vehicle roof sheet metal in a first embodiment of the present invention.
Figure 2:
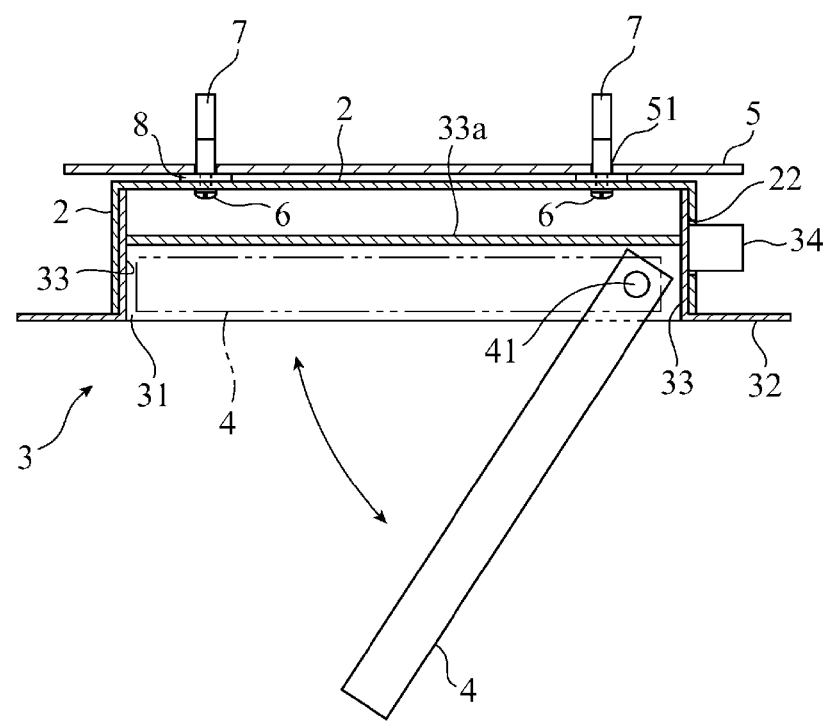
FIG. 2 is a longitudinal sectional view along the line A-A of FIG. 1.
Figure 3:
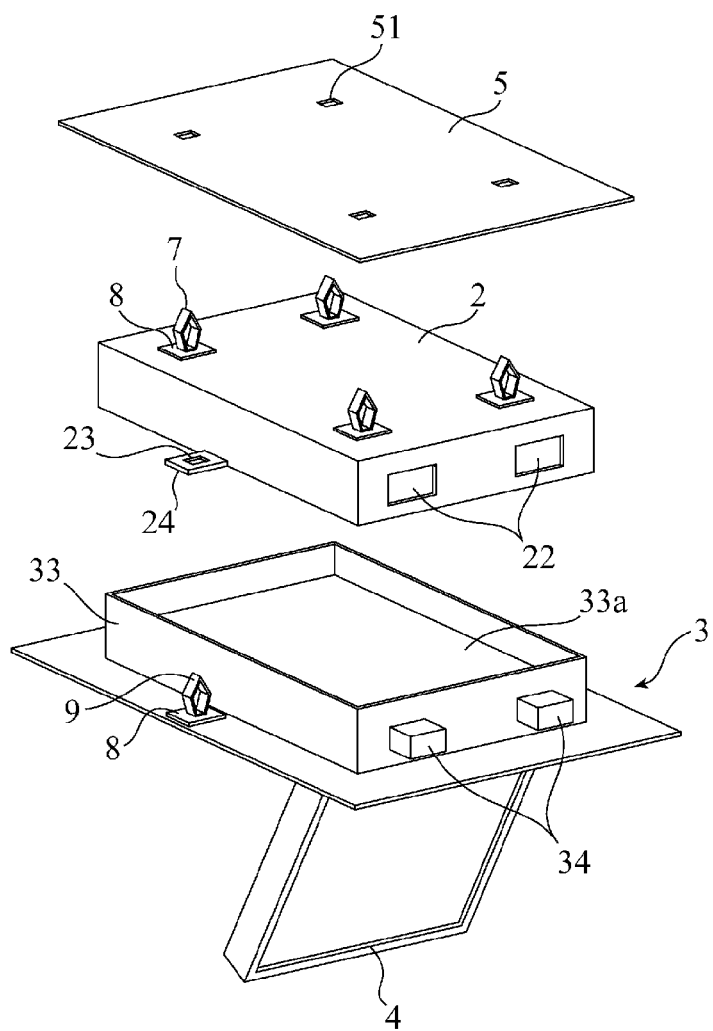
FIG. 3 is an exploded perspective view of the display unit and the vehicle roof sheet metal.

A display unit 1 includes a base sheet metal 2, a display main body 3, and a display 4 as shown in FIG. 1 to FIG. 3. The base sheet metal 2 is formed in the shape of a bottom-opened box, a clip-attaching engaging hole 21 is prepared at the four corners on the top face of the sheet metal; an engaging hole 22 as an engaging section is prepared on one side of the sheet metal, and a supporting arm 24 having an engaging hole 23 is protrusively provided at the lower end edge on the other side thereof.

The display main body 3 is composed of a frame board 32 having provided in the center portion thereof a hole 31 through which a display 4 is folded and unfolded, and a frame 33 provided to surround the periphery of the hole; an engaging projection 34 as an engaging section for engaging with the engaging hole 22 of the base sheet metal 2 is provided on one side of the frame 33, and a clip attaching hole (not shown) is prepared in the frame board 32 on the other side that is orthogonal to the one side thereof. Further, a partition board 33*a* to which a circuit board (not shown) mounted thereon with circuit elements and so on is attached is provided inside the frame 33, and the housing section of the display 4 is formed underneath the partition board 33*a*.

The display 4 is rotatably supported by an opening and closing shaft 41 inside the frame 33; when housed in the housing section, the display is locked by a locking section (not depicted because of a known structure) to be held in the housed position, and when the lock is released, is adapted to be opened to the use position with the shaft 41 as a fulcrum, as shown in FIG. 1 and FIG. 2.

Figure 4:
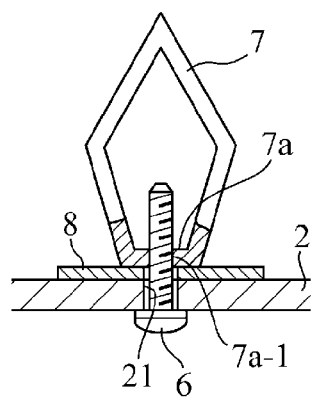
FIG. 4 is a front view showing an attached state of a press-fit clip.

As shown in FIG. 4, a first press-fit clip 7 has a polygon in side shape (resembling a rhombus when engaged with the hole 51 of the vehicle roof sheet metal 5, as shown in FIG. 1), and is formed in an acute angle at the upper end thereof and formed in a plane working as an attaching face at the lower end thereof; a tapped hole 7*a*-1 is formed through a plane section 7*a* thereof.

In the following, an attachment of the display unit 1 to a vehicle roof sheet metal 5 will be described. First, the first press-fit clip 7 is disposed corresponding to the hole 21 on the top face of the base sheet metal 2 with a washer 8 interposed therebetween, and a screw 6 passed through the hole 21 from the side of the bottom face of the base sheet metal 2 is threaded into the tapped hole 7*a*-1 of the plane section 7*a* of the first press-fit clip 7 to thereby attach the first press-fit clips 35 to the top face of the base sheet metal 2 as shown in FIG. 3 and FIG. 4.

Then, similarly to the above, a second press-fit clip 9 having the same shape as that of the first press-fit clip is disposed corresponding to the hole (not shown) of the frame board 32 of the display main body 3 with a washer 8 interposed therebetween, and the second clip is attached to the top face of the frame board with the screw (not shown) passed through the hole from the bottom side of the frame board 32.

After the completion of the attachment of the first press-fit clips 7 and the second press-fit clip 9 as discussed above, as shown in FIG. 1, the first press-fit clips 7 of the base sheet metal 2 are first press-fit into the hole 51 of the vehicle roof sheet metal 5 while being deformed, and are resiliently restored after the press-fitting to be strongly engaged therewith, thus attaching the base sheet metal 2 to the vehicle roof sheet metal 5. As shown in FIGS. 3 and 4, each of the first press-fit clips and the second press-fit clip comprises: a base; two lower edges protruding diagonally and divergently from the base; and two upper edges respectively connected to the two lower edges, the two upper edges converging at an acute angle. The base, the two lower edges, and the two upper edge in combination form a polygonal shape having a widest portion where the lower edges connect with the respective upper edges, the widest portion being compressible to facilitate a press-fit engagement.

Then, the display main body 3 is inclined to insertion-engage the engaging projection 34 provided on one side thereof with the engaging hole 22 of the base sheet metal 2; subsequently, while the other side thereof is being brought near to the base sheet metal 2, the second press-fit clip 9 is press-fit in the engaging hole 23 of the supporting arm 24 of the base sheet metal 2 while being deformed, and is resiliently restored after the press-fitting to strongly engage therewith, thus attaching the display main body 3 to the base sheet metal 2.

In this case, regarding the engaging forces of the first press-fit clips 7 and the second press-fit clip 9, there is a relationship of the first press-fit clips 7>the second press-fit clip 9; thus, when the display main body 3 is downwardly drawn, the second press-fit clip 9 is deformed to be disengaged from the engaging hole 23. Thereafter, the display main body 3 is sidewise moved to disengage the engaging projection 34 from the engaging hole 22 to be thus detached from the base sheet metal 2.

On the other hand, the engaging force of the first press-fit clip 7 is strong so as not to be detached by the downwardly drawing force which detaches the second press-fit clip 9 from the engaging hole 23. Thus, to detach the base sheet metal 2 from the vehicle roof sheet metal 5, it is necessary to remove the screw 6 after detaching of the display main body 3 therefrom as mentioned above, to detach the first press-fit clip 7.

As discussed above, according to the first embodiment, the display main body is arranged such that one side thereof is engaged with the base sheet metal in the engaging section, and the other side thereof is attached to the engaging hole of the base sheet metal by insertion-engaging the second press-fit clip with the engaging hole of the base sheet metal; thus, the attachment is extremely easy, and a line-attachment on a vehicle production line can be easily and quickly performed. Furthermore, in detaching the display main body from the base sheet metal for internal inspection and replacement, when the other side of the display main body is drawn down by a certain force larger than the engaging force of the second press-fit clip, the second press-fit clip is disengaged from the engaging hole; thus, after the disengagement, the display main body is moved to the one end side to release the engagement of the engaging section, which enables to detach extremely easily the display main body from the base sheet metal.

As a result, the attaching and detaching work can be performed by one person to thereby enhance a work efficiency thereof. Moreover, when the display main body is detached from the base sheet metal, the attaching screw of the first press-fit clip attached to the base sheet metal can be manipulated, which eliminates the necessity of providing holes for inserting a screw driver through the partition board of the display main body. Therefore, the working cost can be reduced, and also when the display main body is opened, the outer appearance of the unit is not damaged. Further, there are advantageous effects such that the shape and size of the circuit-elements mounting board provided in the display main body have no constraints involved in hole processings.

Moreover, since the engaging sections of the base sheet metal and of the display main body that engage with each other are arranged to be provided on the side where the opening and closing shaft of the display main body is disposed, the weight of the opened display main body is supported by the base sheet metal, and an unnecessary load is not applied to the opening and closing shaft; thus, the display main body is smoothly opened and closed.

Second Embodiment

In the first embodiment, the base sheet metal 2 has the shape of a bottom-opened box; however, in the second embodiment, a base sheet metal 10 having the shape of a plane board is employed. An engaging projection 11 as an engaging section is protruded and bent in the center of one side edge of the base sheet metal 10, the other side orthogonal to the one side where the engaging projection 11 is formed is protrusively provided with a supporting section 12, and the supporting section 12 is provided with an engaging hole 13 for receiving a second press-fit clip 9. On the other hand, an engaging hole 35 as an engaging section for engaging with the engaging projection 11 is formed on one side of the frame 33 of the display main body 3 to which the base sheet metal 10 is attached, a supporting section 36 is formed at the upper end of the other side orthogonal to the one side where the engaging hole 35 is formed, and the second press-fit clip 9 is attached to the supporting section 36. Note that the other components are the same as those of the first embodiment. Thus, the same parts are designated by similar numerals, and repetitive explanations thereof will be omitted.

In the following, an attachment of the display unit 1 to a vehicle roof sheet metal 5 will be described. First, the first press-fit clips 7 are disposed corresponding to the hole 21 of the base sheet metal 10 with a washer 8 interposed therebetween, and the screw 6 passed through the hole 21 from the bottom side of the base sheet metal 2 is threaded into the tapped hole 7a-1 of the plane section 7a of the first press-fit clip 7 as shown in FIG. 4 above to thereby attach the first press-fit clips 7 to the base sheet metal 10.

Then, similarly to the above, the second press-fit clip 9 is disposed on the supporting section 36 at the upper end of the other side of the frame 33 of the display main body 3 with the washer 8 interposed therebetween, to attach the second press-fit clip thereto with the screw passed through the hole from the bottom side of the supporting section 36.

After the completion of the attachment of the first press-fit clips 7 and the second press-fit clips 9 as discussed above, as shown in FIG. 5, the first press-fit clips 7 of the base sheet metal 10 are first press-fit into the hole 51 of the vehicle roof sheet metal 5 while being deformed, and after the press-fitting, the first press-fit clip 7 is resiliently restored to strongly engage therewith, thus attaching the base sheet metal 10 to the vehicle roof sheet metal 5.

Then, the display main body 3 is inclined to insertion-engage the engaging projection 11 of the base sheet metal 10 with the engaging hole 35 provided on one side of the frame 33; subsequently, while the other side thereof is being brought near to the base sheet metal 10, the second press-fit clip 9 is press-fit in the engaging hole 13 of the supporting arm 12 of the base sheet metal 10 while being deformed, and is resiliently restored after the press-fitting to strongly engage therewith, thus attaching the display main body 3 to the base sheet metal 10.

In this case, regarding the engaging forces of the first press-fit clips 7 and the second press-fit clip 9, there is a relationship of the first press-fit clips 7>the second press-fit clip 9; thus, when the display main body 3 is downwardly drawn, the second press-fit clip 9 is deformed to be disengaged from the engaging hole 23. After the disengagement, the display main body 3 is sidewise moved to disengage the engaging projection 34 from the engaging hole 22 to be thus detached from the base sheet metal 2, as in the first embodiment.

As discussed above, according to the second embodiment, the base sheet metal 2 is provided in the plane board, the engaging projection 11 as the engaging section is bent and protrusively provided on the one side of the sheet metal, the supporting section 12 is formed on the other side orthogonal to the one side where the engaging projection 11 is formed, the engaging hole 13 of the second press-fit clip 9 is prepared in the supporting section 12, the engaging hole 35 as the engaging section for engaging with the engaging projection 11 is prepared in the one side of the frame 33 of the display main body 3, and the second press-fit clip 9 is attached to the supporting section 36 formed at the upper edge on the other side that is orthogonal to the one side where the engaging hole 35 is formed. Thereby, advantageous operations and effects similar to those of the first embodiment discussed above are obtained.

Incidentally, in the examples shown in the figures, it is arranged that the one side of the base sheet metal and that of the display main body are provided with the engaging section, while the other side orthogonal to the one side is provided with the supporting section. However, even when the supporting section is provided on the side opposite to the side where the engaging section is formed, similar operations and effects are obtained.

INDUSTRIAL APPLICABILITY

In the display unit attaching structure according to the present invention, the display main body is arranged such that one side thereof is engaged with the base sheet metal in the engaging section thereof, and the other side thereof is attached by press-fitting the second press-fit clip to the engaging hole of the base sheet metal; thus, the attachment is extremely easy, and the attachment and detachment on a vehicle production line can be easily and quickly performed to be effective for attaching the display main body to the vehicle roof sheet metal.

The invention claimed is:

1. A display unit attaching structure comprising:
  a vehicle roof sheet metal provided with a plurality of engaging holes;
  a base sheet metal which has a plurality of first press-fit clips for engaging with the engaging holes of the vehicle roof sheet metal, and also on one side of which an engaging section is formed, and on the other side of which a supporting section having one or more engaging holes is formed; and
  a display main body which pivotally supports a display openably and closably in a display housing section, and also on one side of which an engaging section for engaging with the engaging section of the base sheet metal is provided, and on at least one other side of which one or more second press-fit clips for engaging with the respective one or more engaging holes of the base sheet metal are provided, wherein each of the plurality of first press-fit clips and the one or more second press-fit clips comprises:
- a base;
- two lower edges protruding diagonally and divergently from the base; and
- two upper edges respectively connected to the two lower edges, the two upper edges converging at an acute angle, wherein the base, the two lower edges, and the two upper edge in combination form a polygonal shape having a widest portion where the lower edges connect with the respective upper edges, the widest portion being compressible to facilitate a press-fit engagement, and wherein the plurality of first press-fit clips have a greater combined engaging force than the one or more second press-fit clips such that the engagement of the one or more second press-fit clips with the respective one or more engaging holes of the base sheet metal are releasable by a tensile force without releasing the engagement of the plurality of first press-fit clips from the respective plurality of engaging holes of the vehicle roof sheet metal.

2. The display unit attaching structure according to claim 1, wherein the base sheet metal has the shape of a bottom-opened box, has an engaging section on one side thereof, and has a supporting section having an engaging hole of the second press-fit clip on the other side thereof, and wherein the display main body is provided with an engaging section which engages with the engaging section of the base sheet metal on one side thereof, and provided with the second press-fit clip which engages with the engaging hole on the other side thereof.

3. The display unit attaching structure according to claim 1, wherein the base sheet metal is provided in a plane board, on one side edge of which an engaging section is formed in a protrusively bent manner, and on the other side of which a supporting section having an engaging hole of the second press-fit clip is formed in a protrusively bent manner, and wherein the display main body is provided on one side thereof an engaging section for engaging with the engaging section of the base sheet metal, and on the other side thereof the second press-fit clip for engaging with the engaging hole.

4. The display unit attaching structure according to claim 1, wherein the engaging section in which the base sheet metal and the display main body engage with each other is provided on the side where an opening and closing shaft of the display main body is disposed.

\* \* \* \* \*